US010769068B2

(12) United States Patent
Matsakis et al.

(10) Patent No.: US 10,769,068 B2
(45) Date of Patent: Sep. 8, 2020

(54) CONCURRENT MODIFICATION OF SHARED CACHE LINE BY MULTIPLE PROCESSORS

(71) Applicant: INTERNATIONAL BUSINESS MACHINES CORPORATION, Armonk, NY (US)

(72) Inventors: Nicholas C. Matsakis, Poughkeepsie, NY (US); Craig R. Walters, Highland, NY (US); Jane H. Bartik, Poughkeepsie, NY (US); Chung-Lung K. Shum, Wappingers Falls, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 15/809,049

(22) Filed: Nov. 10, 2017

(65) Prior Publication Data

US 2019/0146916 A1 May 16, 2019

(51) Int. Cl.
*G06F 12/00* (2006.01)
*G06F 12/084* (2016.01)
(52) U.S. Cl.
CPC .... *G06F 12/084* (2013.01); *G06F 2212/1024* (2013.01)
(58) Field of Classification Search
CPC ............... G06F 12/084; G06F 12/0811; G06F 12/0831; G06F 2212/1024
See application file for complete search history.

(56) References Cited

U.S. PATENT DOCUMENTS

| 4,136,386 | A | 1/1979 | Annunziata et al. |
| 5,715,428 | A | 2/1998 | Wang et al. |
| 6,516,393 | B1 * | 2/2003 | Fee ........................ G06F 12/084 |
| | | | 711/150 |
| 6,571,322 | B2 | 5/2003 | Arimilli et al. |
| 6,928,525 | B1 | 8/2005 | Ebner et al. |
| 9,092,345 | B2 | 7/2015 | Nystad et al. |
| 9,417,910 | B2 | 8/2016 | Dice et al. |
| 2002/0124144 | A1 | 9/2002 | Gharachorloo et al. |
| 2011/0185125 | A1 * | 7/2011 | Jain ..................... G06F 12/0811 |
| | | | 711/122 |
| 2011/0225372 | A1 | 9/2011 | Pirog |

(Continued)

OTHER PUBLICATIONS

Akkoorath, Deepth Devaki et al., "Global-Local View: Scalable Consistency for Concurrent Data Types," May 22, 2017, pp. 1-16.

(Continued)

*Primary Examiner* — Arvind Talukdar
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A shared cache line is concurrently modified by multiple processors of a computing environment. The concurrent modification is performed based, at least, on receiving one or more architected instructions (Fetch due to Non-Coherent Store instructions) that permit multiple processors to concurrently update the shared cache line absent obtaining a lock or having exclusive ownership of the data.

20 Claims, 11 Drawing Sheets

(56) References Cited

U.S. PATENT DOCUMENTS

2013/0159626 A1\* 6/2013 Katz ................... G06F 3/0608
711/119
2017/0357586 A1\* 12/2017 Sury .................. G06F 12/0828

OTHER PUBLICATIONS

Shum, C. Kevin, "IBM z Systems Processor Optimization Primer," Mar. 2016, pp. 1-50.
IBM, "Power ISA—V2.07B," Apr. 9, 2015, pp. 1-1527.
IBM, "z/Architecture—Principles of Operation," IBM Publication No. SA22-7832-10, Eleventh Edition, Mar. 2015, pp. 1-1732.
Intel, "Avoiding and Identifying False Sharing Among Threads," https://software.intel.com/en-us/articles/avoiding-and-identifying-false-sharing-among-threads, downloaded from internet Oct. 26, 2017, pp. 1-5.
Kristensen, Anders et al., "Problem-Oriented Object Memory: Customozing Consistency," Hewlett Packard, HPL-95-85, Jul. 1995, pp. 1-15 (+ cover).
Mel, Peter and Tim Grance, "The NIST Definition of Cloud Computing," National Institute of Standards and Technology, Information Technology Laboratory, Special Publication 800-145, Sep. 2011, pp. 1-7.
Zhang, Guowei et al., "Exploiting Commutativity to Reduce the Cost of Updates to Shared Data in Cache-Coherent Systems," Proceedings of the 48th International Symposium on Microarchitecture, ACM, Dec. 2015, pp. 1-13.

\* cited by examiner

OBTAIN, FROM A PLURALITY OF PROCESSORS OF THE COMPUTING ENVIRONMENT, A PLURALITY OF STORE REQUESTS TO STORE TO A SHARED CACHE LINE ~700

THE PLURALITY OF STORE REQUESTS BEING OF A CONCURRENT STORE TYPE ~701

STORE CONCURRENTLY, BASED ON THE PLURALITY OF STORE REQUESTS, DATA TO THE SHARED CACHE LINE ~702

SET A CACHE DIRECTORY STATE ASSOCIATED WITH THE SHARED CACHE LINE TO SHARED-MODIFIABLE INDICATING MULTIPLE STORE REQUESTS BY MULTIPLE PROCESSORS ARE PERMISSIBLE ~704

THE DATA INCLUDES AN UPDATE TO A GLOBAL SHARED-MODIFIABLE STRUCTURE MAINTAINED IN THE SHARED CACHE LINE ~706

THE GLOBAL SHARED-MODIFIABLE STRUCTURE IS USED BY MULTIPLE PROCESSORS OF THE PLURALITY OF PROCESSORS ~708

710

OBTAIN A FETCH REQUEST REQUESTING ACCESS TO THE SHARED CACHE LINE

THE FETCH REQUEST BEING DIFFERENT FROM THE CONCURRENT STORE TYPE ~711

PERFORM SERIALIZATION FOR THE SHARED CACHE LINE BASED ON THE FETCH REQUEST ~712

READ THE DATA FROM THE SHARED CACHE LINE, BASED ON COMPLETING THE SERIALIZATION ~714

FIG. 7A

CONCURRENT MODIFICATION OF SHARED CACHE LINE BY MULTIPLE PROCESSORS

BACKGROUND

One or more aspects relate, in general, to processing within a computing environment, and in particular, to facilitating such processing.

Processing within a computing environment includes accessing memory, including main memory and memory caches, to read or store data. The updating of such data is complex in computing environments that include multiple processors having access to the data to be updated. In such multi-processor computing environments, it is common for the computer hardware to have an atomic update instruction, such as a compare and swap (CS) instruction, which attempts to update a field to a new value after having fetched the current value of the field. While blocking other processors from performing the same function at the same time, the compare compares an old value with the current value. If the old value is equal to the current value, then the current value is replaced with the new value. If the old value is not equal to the current value, then the new value is not stored and the user is informed, via a condition code, that the value was not updated and processing loops back to manipulate the current value.

In order for the compare and swap to compare and update the field, it brings the field into a private cache of the local processor and invalidates it from the private caches of other processors. This causes address delays which degrades performance. The more frequently the field is updated, the more degradation.

One approach to minimize this overhead is to update unique individual processor related fields, such as counters, which removes the conflict between the processors. The current values are requested on a periodic basis by a reader or monitoring program, and based on the request, the values are aggregated and the results are provided. This greatly reduces the overhead. However, this adds complexity, and there are cases where the counters already existed and providing a service to aggregate the processor related values is impractical, if not impossible.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes, for instance, obtaining, from a plurality of processors of the computing environment, a plurality of store requests to store to a shared cache line. The plurality of store requests are of a concurrent store type. Based on the plurality of store requests, data is concurrently stored to the shared cache line. By allowing concurrent updates to a shared cache line, processing is facilitated, complexity is reduced, and performance is improved.

In one embodiment, a cache directory state associated with the shared cache line is set to shared-modifiable indicating multiple store requests by multiple processors are permissible.

As an example, the data includes an update to a global shared-modifiable structure maintained in the shared cache line. The global shared-modifiable structure is used by multiple processors of the plurality of processors.

In a further aspect, a fetch request requesting access to the shared cache line is obtained. The fetch request is different from the concurrent store type. Based on the fetch request, serialization is performed for the shared cache line. Based on completing the serialization, the data is read from the shared cache line. By performing serialization based on the fetch request, but not a request defined to allow concurrent updates by multiple processors, delays are reduced and performance is improved.

The performing serialization includes, e.g., stopping outstanding stores to the shared cache line, and synchronizing data of the shared cache line.

Further, in one example, based on the fetch request, ownership state of the shared cache line is changed from shared-modifiable to another state. The other state is, e.g., exclusive or read-only, based on the fetch request.

In one example, the obtaining the plurality of store requests includes receiving a plurality of fetch due to non-coherent store requests from the plurality of processors. The fetch due to non-coherent store requests are architecturally defined to allow non-blocking modifications to the shared cache line.

Further, in one example, the storing includes storing the data directly to the shared cache line absent storing the data in one or more private caches of the plurality of processors.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7B depict one embodiment of facilitating processing within a computing environment, in accordance with an aspect of the present invention;

DETAILED DESCRIPTION

In accordance with an aspect of the present invention, a capability is provided to concurrently modify a shared cache line by multiple processors (also referred to as cores) of a computing environment. Multiple processors can access and update data or a field, such as a counter, absent obtaining a lock or having exclusive ownership of the data or field.

In one example, the capability includes a non-blocking atomic compare and swap instruction, referred to herein as a Fetch due to Non-Coherent Store (FNC) instruction, which may be used to update data or fields, such as counters, that are updated frequently, but read infrequently. The instruction is, for instance, a hardware instruction defined by an architecture, such as the z/Architecture, offered by International Business Machines Corporation, Armonk, N.Y. The instruction asynchronously increments or decrements the data, e.g., a count, without having to bring the data into a local, private cache or iterate on comparison misses, thus, eliminating much of the overhead on updates. Using the fetch due to non-coherent store instruction, a cache line in a shared cache is fetched with modify intent, and the data may be modified concurrently by one or more processors, operating in a manner that is non-coherent under, for instance, traditional MESI or z/Architecture coherency rules.

One embodiment of a computing environment to incorporate and use one or more aspects of the present invention is described with reference to FIG. 1. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures, or the Qualcomm Snapdragon architectures. Other examples also exist.

Figure 1:
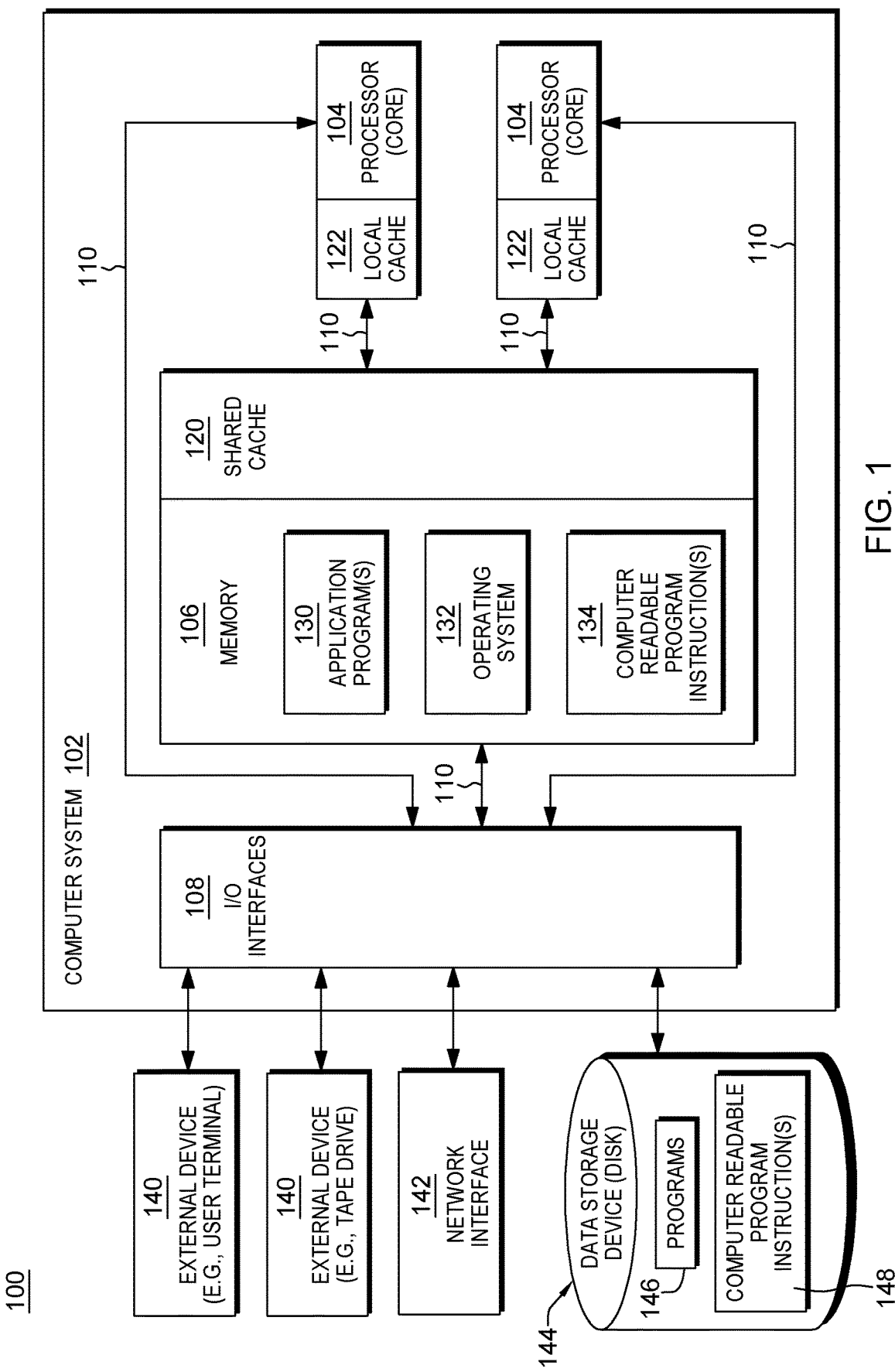
FIG. 1 depicts one example of a computing environment to incorporate and use one or more aspects of the present invention.

As shown in FIG. 1, a computing environment 100 includes, for instance, a computer system 102 shown, e.g., in the form of a general-purpose computing device. Computer system 102 may include, but is not limited to, one or more processors, processing units or cores 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
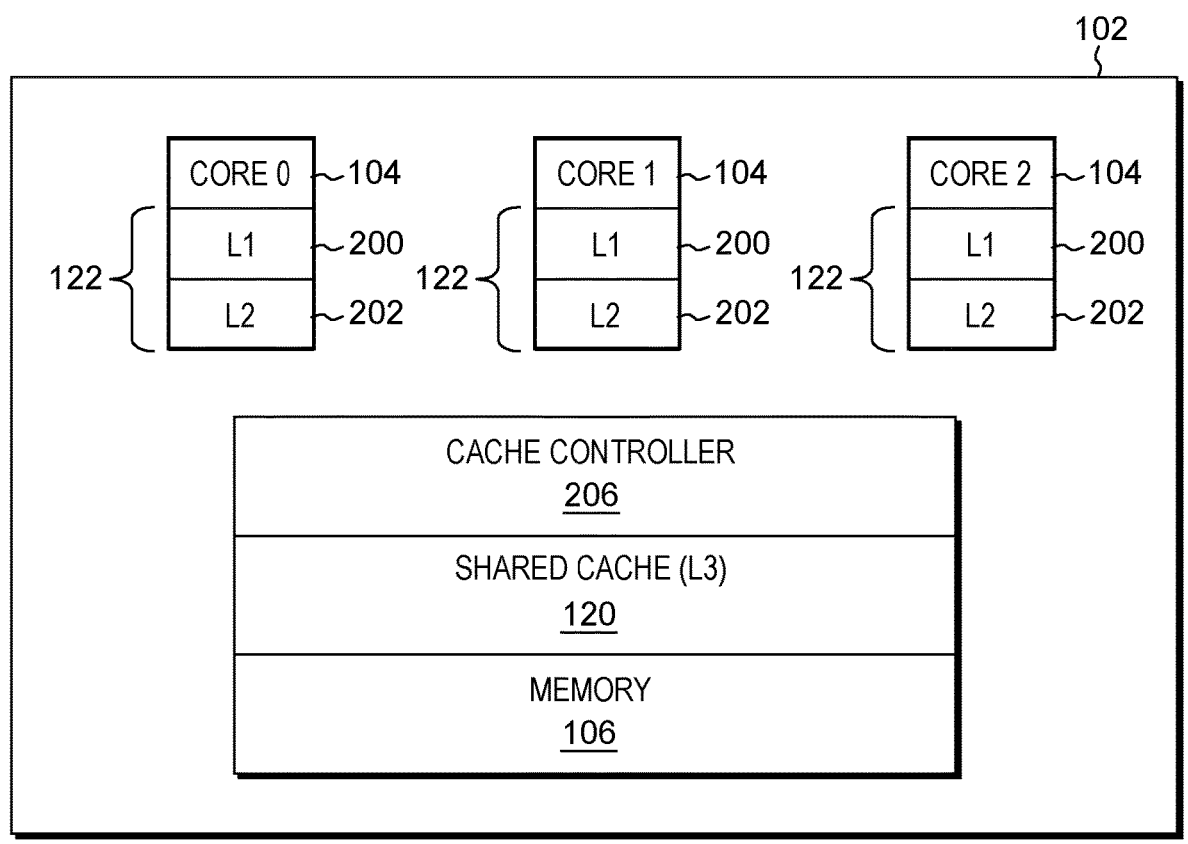
FIG. 2 depicts further details of a memory hierarchy used by the computer system of FIG. 1, in accordance with one or more aspects of the present invention.

Further details regarding processors 104 and a memory hierarchy used by the processors are described with reference to FIG. 2. In one example, computer system 102 includes a plurality of processors or cores 104. In this example, three cores are shown, Cores 0, 1 and 2; however, a computer system may have more or less cores than described herein. Each core has a private local cache 122. Local cache 122 includes, for instance, an L1 cache 200 and an L2 cache 202. Other configurations are possible.

Local cache 122 is part of a memory hierarchy used by processors 104. The memory hierarchy further includes a shared cache 120 (e.g., an L3 cache) accessible by the plurality of processors 104, and main memory 106. It may also include other and/or different caches or cache levels, in other embodiments.

The transfer of data between the processor, main memory, and the cache memory is controlled, e.g., by a cache controller 206.

Shared cache 120 (and the memory in general) may operate under a cache coherence protocol, such as the MESI protocol. The MESI protocol is an invalidate-based cache coherence protocol, which supports write-back caches. The letters in the acronym MESI represent four exclusive states that a cache line can be marked with (encoded using, e.g., two bits):

Modified (M): The cache line is present only in the current cache, and is dirty (i.e., it has been modified (M state) from the value in main memory). The cache is to write the data back to main memory at some time in the future, before permitting any other read of the (no longer valid) main memory state. The write-back changes the line to the shared state (S).

Exclusive (E): The cache line is present only in the current cache, but is clean (i.e., it matches main memory). It may be changed to the shared state at any time, in response to a read request. Alternatively, it may be changed to the modified state when writing to it.

Shared (S): Indicates that this cache line may be stored in other caches of the machine and is clean—it matches the main memory. The line may be discarded (changed to the invalid state) at any time.

Invalid (I): Indicates that this cache line is invalid (unused).

Figure 3:
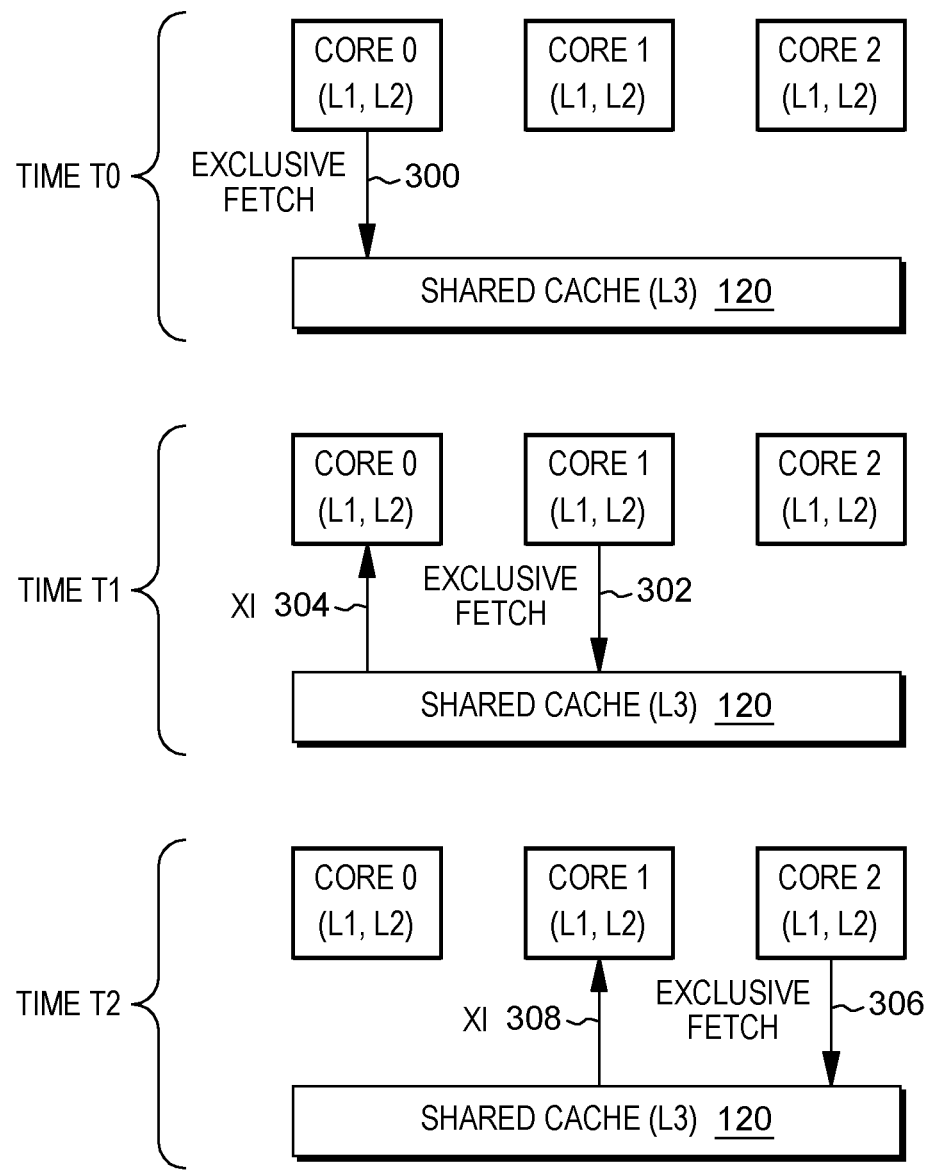
FIG. 3 depicts one example of processing associated with an exclusive fetch operation.

One example of using the MESI protocol is described with reference to FIG. 3. In the scenario of FIG. 3, an exclusive fetch is performed by three different processors or cores at various times: time T0, time T1, and time T2, in which T0<T1<T2. An exclusive fetch is a processor fetch with an intent to modify the contents of a cache line. In one example, a global counter in the shared cache is to be modified.

Referring to FIG. 3, in one example, at time T0, Core 0, due to a cache miss in local caches L1, L2 of Core 0, executes an exclusive fetch 300 to cache line A in shared cache 120. There is a cache hit in shared cache 120 (L3), and thus, Core 0 receives exclusive ownership of the shared cache line. Based on receiving exclusive ownership of the cache line, Core 0 can now store into cache line A (e.g., 1 store, hot global counter). To perform the store, Core 0 starts bringing cache line A back to Core 0 in order to store cache line A (i.e., store the value/data) in the local cache (L1 and/or L2) of Core 0.

At time T1, Core 1, due to a cache miss in local caches L1, L2 of Core 1, executes an exclusive fetch 302 to cache line A in shared cache 120. There is a cache hit in shared cache 120 (L3), and thus, due to the MESI coherency protocols, a cross-invalidate (XI) 304 request is sent to Core 0 to request that Core 0 relinquish ownership of cache line A. In other words, Core 0 receives the cross-invalidate (XI) to invalidate previous copies of the data in the local caches that relate to cache line A. Core 0 is in the process of performing a compare and swap such that the value of cache line A brought in from shared cache 120 is to be compared to the previous value in the local cache (L1 and/or L2), and the value of cache line A will be stored in the local cache of Core 0 if the values of cache line A and the local cache are different. However, no store is able to occur in the local cache of Core 0 because Core 1 has now taken exclusive ownership of cache line A in shared cache 120 away from Core 0, and thus, the compare and swap procedure fails (i.e., the compare and swap was interrupted before completion so no store occurs).

At time T2, Core 2, due to a cache miss in local caches L1, L2 of Core 2, executes an exclusive fetch 306 to cache line A in shared cache 120. There is a cache hit in shared cache 120 (L3), and thus, due to the MESI coherency protocols, a cross-invalidate (XI) request 308 is sent to Core 1 to request that the processor relinquish ownership of cache line A. In other words, Core 1 receives cross-invalidate (XI) 308 to invalidate previous copies of the data in the local caches that relate to cache line A. Core 1 is in the process of performing a compare and swap such that the value of cache line A brought in from shared cache 120 is to be compared to the previous value in the local cache (L1 and/or L2), and the value of cache line A will be stored in the local cache of Core 1, if the values of cache line A and the local cache are different. However, no store is able to occur in the local cache of Core 1 because Core 2 has now taken exclusive ownership of shared cache 120 away from Core 1, and thus, the compare and swap procedure fails (i.e., the compare and swap was interrupted before completion so no store occurs). Core 2 continues with its requested update.

As described with reference to the above scenario, while one processor is updating the shared cache line, other processors are blocked (e.g., via locks and/or via atomic operations), thereby, providing cache coherency. Cache coherency is the uniformity of shared resource data that is stored in multiple local caches and the consistency of the cache data as visible by the processors within the system.

However, in accordance with one or more aspects of the present invention, a new type of cache directory state (e.g., a new MESI state) and a new fetch type are provided that enable multiple cores to modify the contents of a cache line concurrently without blocking and while ensuring coherence and visible data consistency. This new directory state is referred to as shared-modifiable or fetch non-coherent (X) in the context of the MESI protocol, and the fetch operation is referred to as 'Fetch due to Non-Coherent Store'. When a cache line is placed in the shared-modifiable or fetch non-coherent state for stores, coherency is still provided, but visible coherency is obscured. From a processor's perspective, the processor may store into the cache line, but the processor does not inspect the content that is being updated. For instance, a value of the cache line is incremented/decremented or multiplied, etc., but this is done blindly without knowing the value at that particular time. If a processor wants to look at the data (e.g., a fetch that is not a fetch due to non-coherent), then serialization is performed prior to the fetch.

As described above, in the MESI protocol, cache lines exist in one of the following states: modified, exclusive, shared, or invalid. Exclusive and shared states are entered by exclusive/read-only fetches accessing a cache address; modified uses an exclusive fetch followed by a processor store; and invalid has a chip/cache that pulls the line away or is an initial directory state. With each state transition, modifications to the cache line are written back to memory to ensure coherency.

With the addition of the shared-modifiable or fetch non-coherent (X) state, the cache line can be recognized as existing in a state, in which one or more cores can be concurrently storing to the cache line for, e.g., a common operation, such as incrementing/decrementing a value of a global shared-modifiable structure (e.g., a common debug counter, other counter or a lock), and for other more complex operations. With concurrent storing, one core may begin storing to the cache line before another core completes its storing by pushing the modification requests from the private caches to the shared cache level(s) where the modification to the data associated with the cache line takes place.

Figure 4:
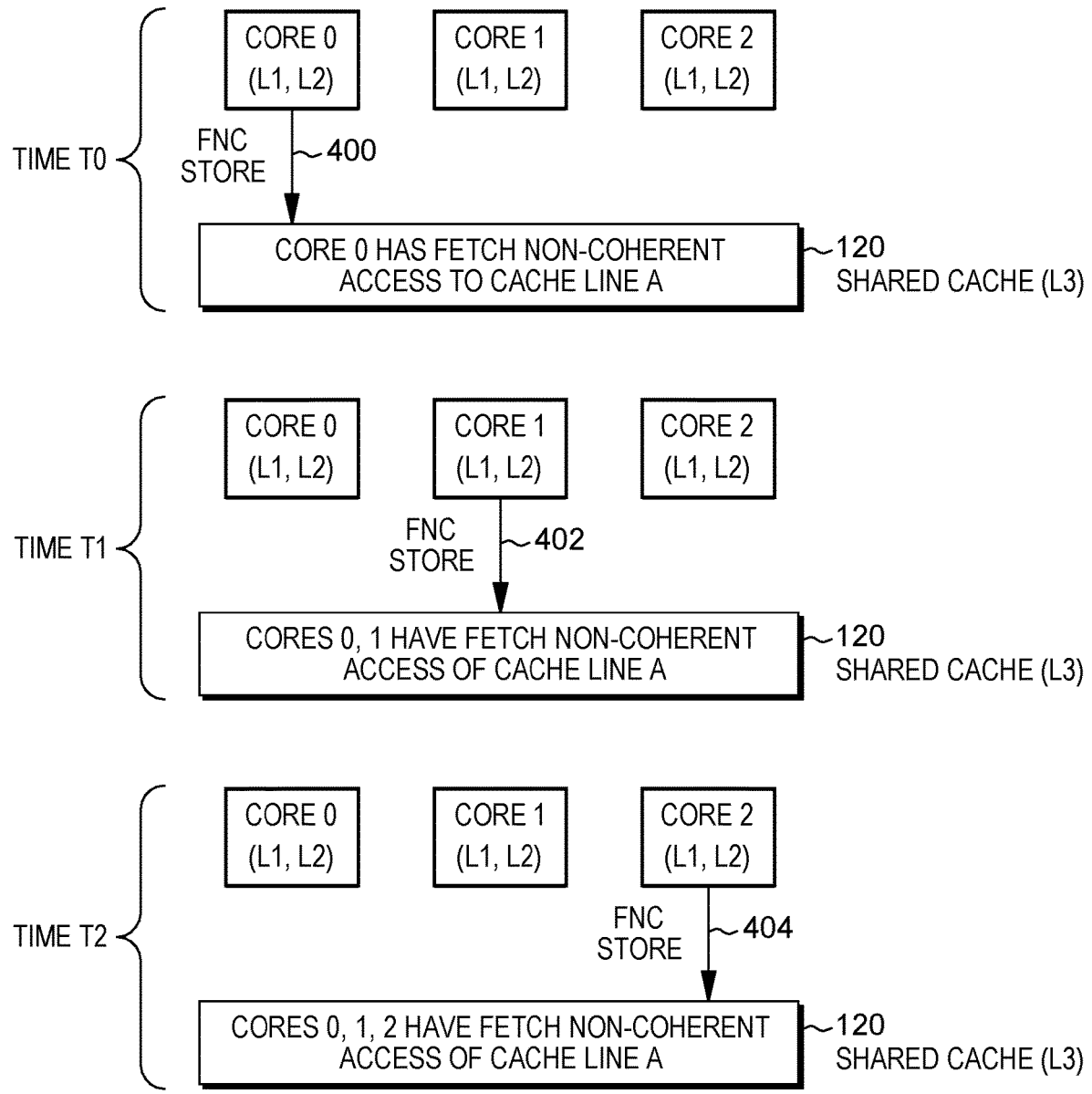
FIG. 4 depicts one example of processing associated with a fetch due to non-coherent operation, in accordance with one or more aspects of the present invention.

One example of a scenario using an updated MESI protocol that includes a fetch non-coherent operation, in accordance with one or more aspects of the present invention, is described with reference to FIG. 4. Times T0, T1, and T2 are illustrated in which T0<T1<T2.

At time T0, Core 0 executes a Fetch due to Non-Coherent Store (FNC) instruction 400 to cache line A in shared cache 120. Based on the fetch non-coherent request, Core 0 is provided access to cache line A and enables Core 0 to issue read/modify/write operations (e.g., increment/decrement) to the shared cache level for updating the content of the target cache, in this example. Further, the FNC operation sets a cache directory state (shared-modifiable or fetch non-coherent) enabling one or more cores to subsequently concurrently store into the shared cache line. The Fetch due to Non-Coherent allows multiple cores to store to the cache line while maintaining visible cache line coherency and data consistency from a processor's perspective. Concurrent update/modifications are enabled with reduced overhead due to masking the serialization penalty in traditional architectures.

At time T1, Core 1 executes a Fetch due to Non-Coherent Store instruction 402 to cache line A in shared cache 120. Since that line has a state of fetch non-coherent, Core 1 may also update the shared cache line without a cross-invalidate being issued to Core 0. Multiple stores from both Core 0 and Core 1 may be issued to cache line A provided no intervening non-concurrent store type fetch (e.g., a fetch that is not a fetch non-coherent store) occurs.

At time T2, Core 2 executes a Fetch due to Non-Coherent instruction 404 to cache line A in shared cache 120. Since that line has a state of fetch non-coherent, Core 2 may also update the shared cache line without a cross-invalidate being issued to Core 1 (or Core 0).

In each of the Fetch due to Non-Coherent operations, the shared cache line is updated without bringing the data into any of the local, private caches.

Figure 5:
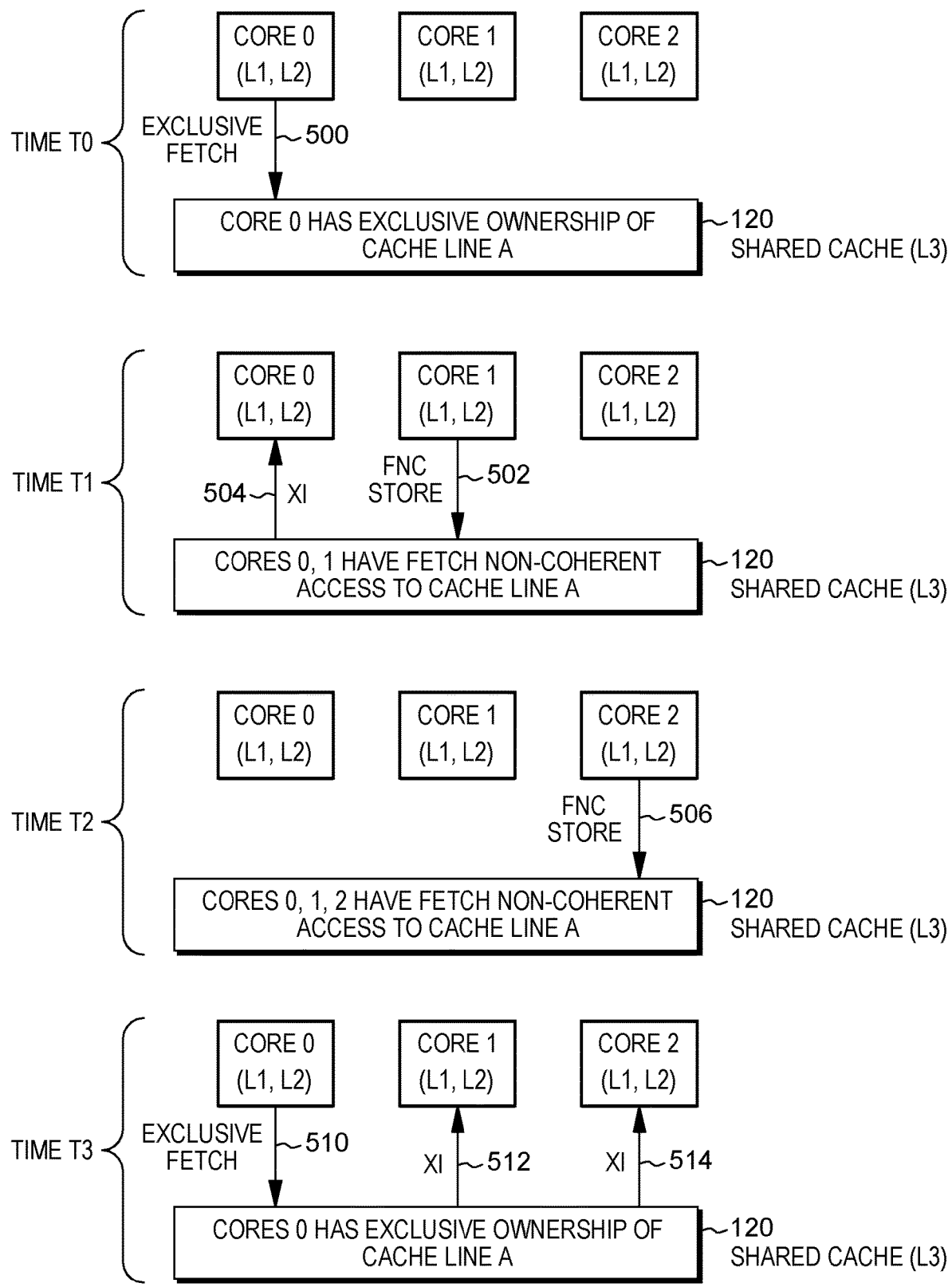
FIG. 5 depicts another example of processing associated with a fetch due to non-concurrent operation, in accordance with one or more aspects of the present invention.

Another example of using Fetch due to Non-Coherent operations is described with reference to FIG. 5. In this example, at time T0, Core 0 issues an exclusive fetch 500 for shared cache line A. Then, at time T1, Core 1 issues a Fetch due to Non-Coherent instruction 502 for shared cache line A. Since Core 0 has exclusive ownership of cache line A, instead of shared-modifiable or fetch non-coherent ownership, a cross-invalidate 504 is issued to Core 0 demoting ownership from exclusive to shared-modifiable or fetch non-coherent. Thus, both Cores 0 and 1 are able to update shared cache line A.

At time T2, Core 2 executes a Fetch due to Non-Coherent instruction 506 to cache line A in shared cache 120. Since that line has a state of fetch non-coherent, Core 2 may also update the shared cache line.

At time T3, Core 0 determines that it would like exclusive ownership of shared cache line A. Therefore, Core 0 issues an exclusive fetch 510 for the shared cache line. Based on the exclusive fetch 510, cross-invalidates 512, 514 are issued to Cores 1 and 2, respectively. Based on the exclusive fetch, the stores are merged in the shared cache, and the updated value is returned to Core 0. For instance, the cross-invalidates to the other cores are used to inform the cores that they are to stop storing into the cache line. All outstanding stores are to drain into the L3 cache and complete. After which point, the processor issuing the exclusive fetch can be returned an updated version of the cache line.

As described herein, multiple processors have concurrent write access to a shared cache line, which eliminates the need for cross-invalidates and serialization overhead, facilitating processing within a computing environment. This is used, e.g., for frequent write, low read use cases.

Figure 6:
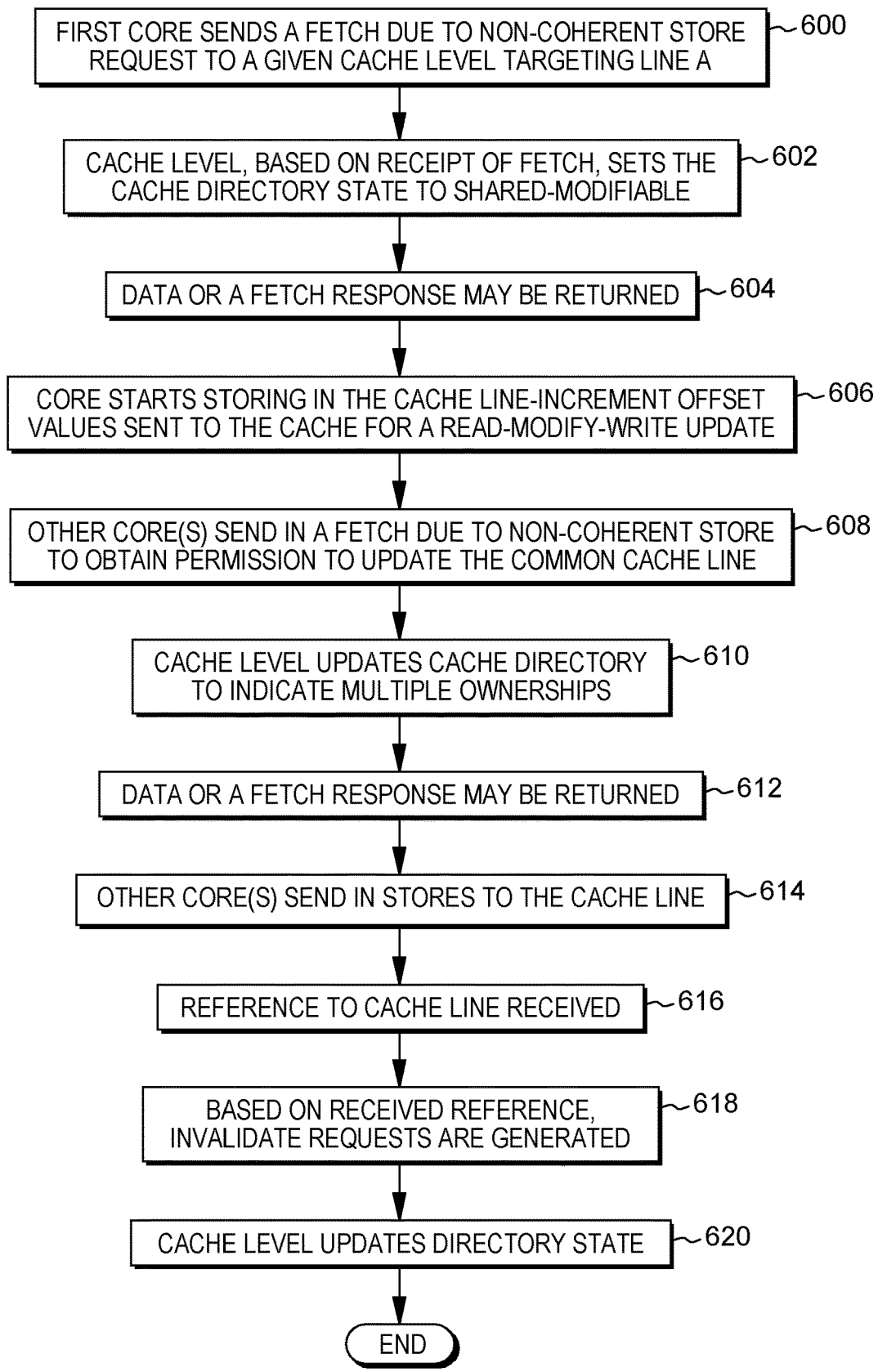
FIG. 6 depicts further details associated with processing fetch due to non-coherent requests, in accordance with one or more aspects of the present invention.

Further details relating to the concurrent modification of a shared cache line are described with reference to FIG. 6. A first processor or core sends a 'Fetch due to Non-Coherent Store' request to a given cache level (e.g., L3) targeting shared cache line A, STEP 600. The cache level, based on receipt of the fetch request, sets the cache directory state for the targeted cache line to shared-modifiable or fetch non-coherent, STEP 602. Further, the data associated with the cache line may be returned to the requesting processor, or given the initial state does not matter, a fetch response may be returned to the requesting processor, STEP 604. The processor starts storing to the cache line, STEP 606, in which the updated value (or, e.g., the amount to be incremented/decremented) is sent to the shared cache for a read-modify-write update. The update is sent directly to the shared cache (e.g., L3 cache) and is not written to the private caches (e.g., L1, L2 caches).

One or more additional processor(s) subsequently send in a 'Fetch due to Non-Coherent Store' request to obtain permission to update the common, shared cache line, STEP 608. The cache level, based on receipt of the additional fetch requests, updates the cache directory to indicate multiple ownership, STEP 610, and either returns a copy of the data associated with the cache line or a simple fetch response, STEP 612. The additional core(s) subsequently send stores directly to the cache line (without storing to the private cache(s)), STEP 614. The store values indicate, e.g., the increment/decrement offset values that the cache level uses to update the cache data content as a read-modify-write operation.

Based on receipt of a reference to the cache line (e.g., a fetch type other than the 'Fetch due to Non-Coherent Store' request), STEP 616, the cache level detects that a processor is looking to inspect the value of the data associated with the cache line and generates a set of cross-invalidate requests to the cache line, forcing cores attached to the cache level to stop storing into the cache line, STEP 618. Based on receiving invalidate responses from the cores having shared-modifiable or fetch non-coherent ownership of the cache line, the cache level updates the directory state as read-only or exclusive to the requesting processor, based on the type of fetch operation sent into the cache level by the processor intending to inspect the contents of the data associated with the cache line, STEP 620. Thus, based on receiving a request other than a Fetch Non-Coherent Store request, serialization is performed in which outstanding stores are stopped, cache content is synchronized, and the resultant value is returned to the requesting processor.

To facilitate this process, the cache level may have a short RMW (read, modify, write) buffer to expedite handling of the operations, enabling more frequent store operations than deemed by twice the depth of the pipeline at a given cache level.

Based on the foregoing, in one example, multiple cores may concurrently store to the same cache line, e.g., the same software counter or a different software counter in a cache line, without bringing the counter values into the private caches. Multiple processors can concurrently maintain write access to a single cache line, while ensuring data integrity via a shared-modifiable or fetch non-coherent directory state. Cross-invalidates are not used and serialization overhead is reduced. Thus, performance within the computing environment may be improved.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 7A-7B.

Referring to FIG. 7A, in one embodiment, a plurality of store requests to store to a shared cache line are obtained from a plurality of processors of the computing environment (700). The plurality of store requests are of a concurrent store type (701). Based on the plurality of store requests, data is concurrently stored to the shared cache line (702). Further, in one embodiment, a cache directory state associated with the shared cache line is set to shared-modifiable indicating multiple store requests by multiple processors are permissible (704).

As an example, the data includes an update to a global shared-modifiable structure maintained in the shared cache line (706). The global shared-modifiable structure is used by multiple processors of the plurality of processors (708).

In a further aspect, a fetch request is obtained requesting access to the shared cache line (710). The fetch request is different from the concurrent store type (711). Based on the fetch request, serialization is performed for the shared cache line (712), and based on completing the serialization, the data is read from the shared cache line (714).

Figure 7B:
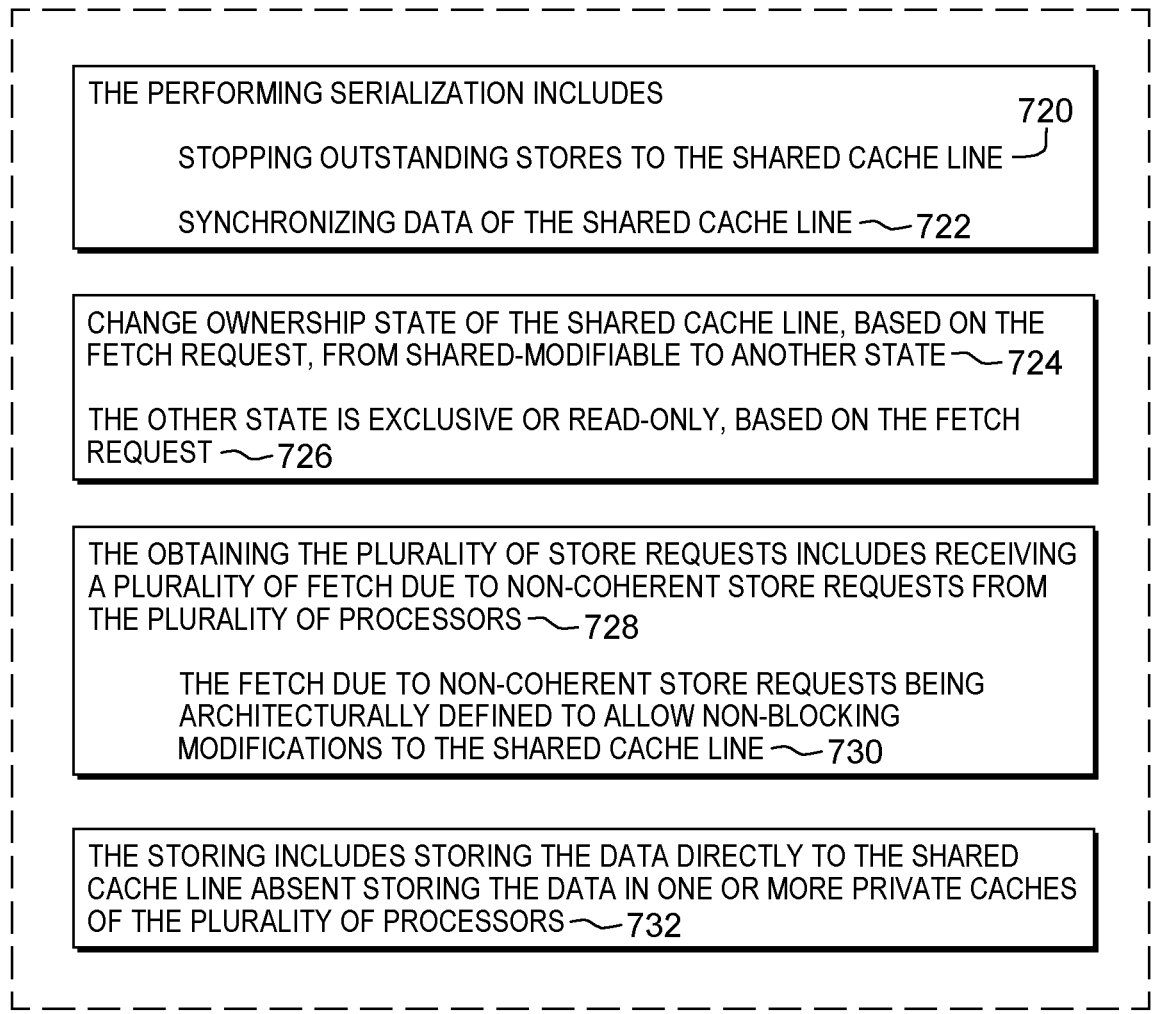

As one example, referring to FIG. 7B, the performing serialization includes stopping outstanding stores to the shared cache line (720), and synchronizing data of the shared cache line (722).

Further, in one embodiment, based on the fetch request, ownership state of the shared cache line is changed from shared-modifiable to another state (724). The other state is exclusive or read-only, based on the fetch request (726).

In one embodiment, the obtaining the plurality of store requests includes receiving a plurality of fetch due to non-coherent store requests from the plurality of processors (728). The fetch due to non-coherent store requests being architecturally defined to allow non-blocking modifications to the shared cache line (730).

Moreover, in one embodiment, the storing includes storing the data directly to the shared cache line absent storing the data in one or more private caches of the plurality of processors (732).

Other variations and embodiments are possible.

Figure 8A:
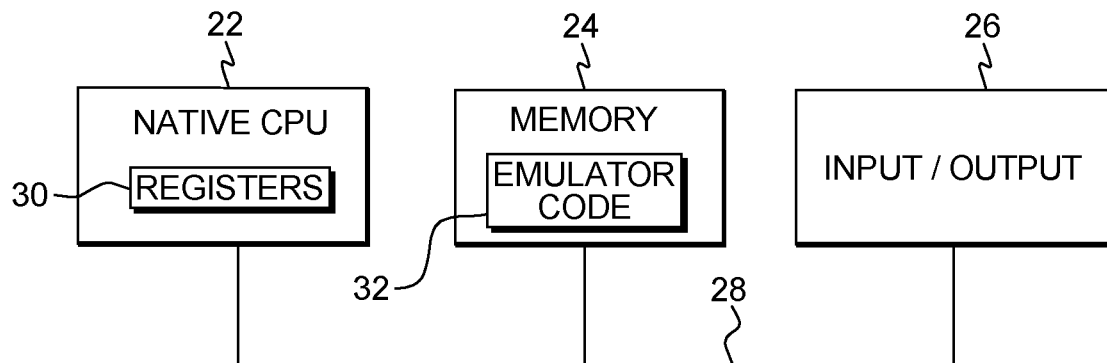
FIG. 8A depicts another example of a computing environment to incorporate and use one or more aspects of the present invention.

Other types of computing environments may also incorporate and use one or more aspects of the present invention, including, but not limited to, emulation environments, an example of which is described with reference to FIG. 8A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a pSeries server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 8B:
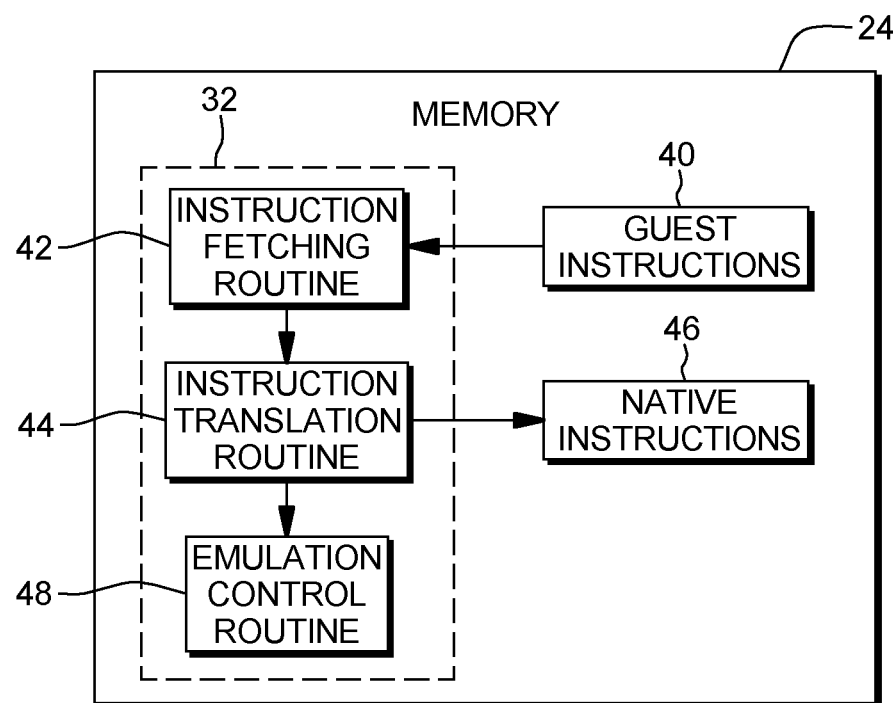
FIG. 8B depicts further details of the memory of FIG. 8A.

Further details relating to emulator code 32 are described with reference to FIG. 8B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 40 that is obtained, translated and executed may be, for instance, one of the instructions described herein. The instruction, which is of one architecture (e.g., the z/Architecture), is fetched from memory, translated and represented as a sequence of native instructions 46 of another architecture (e.g., PowerPC, pSeries, Intel, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
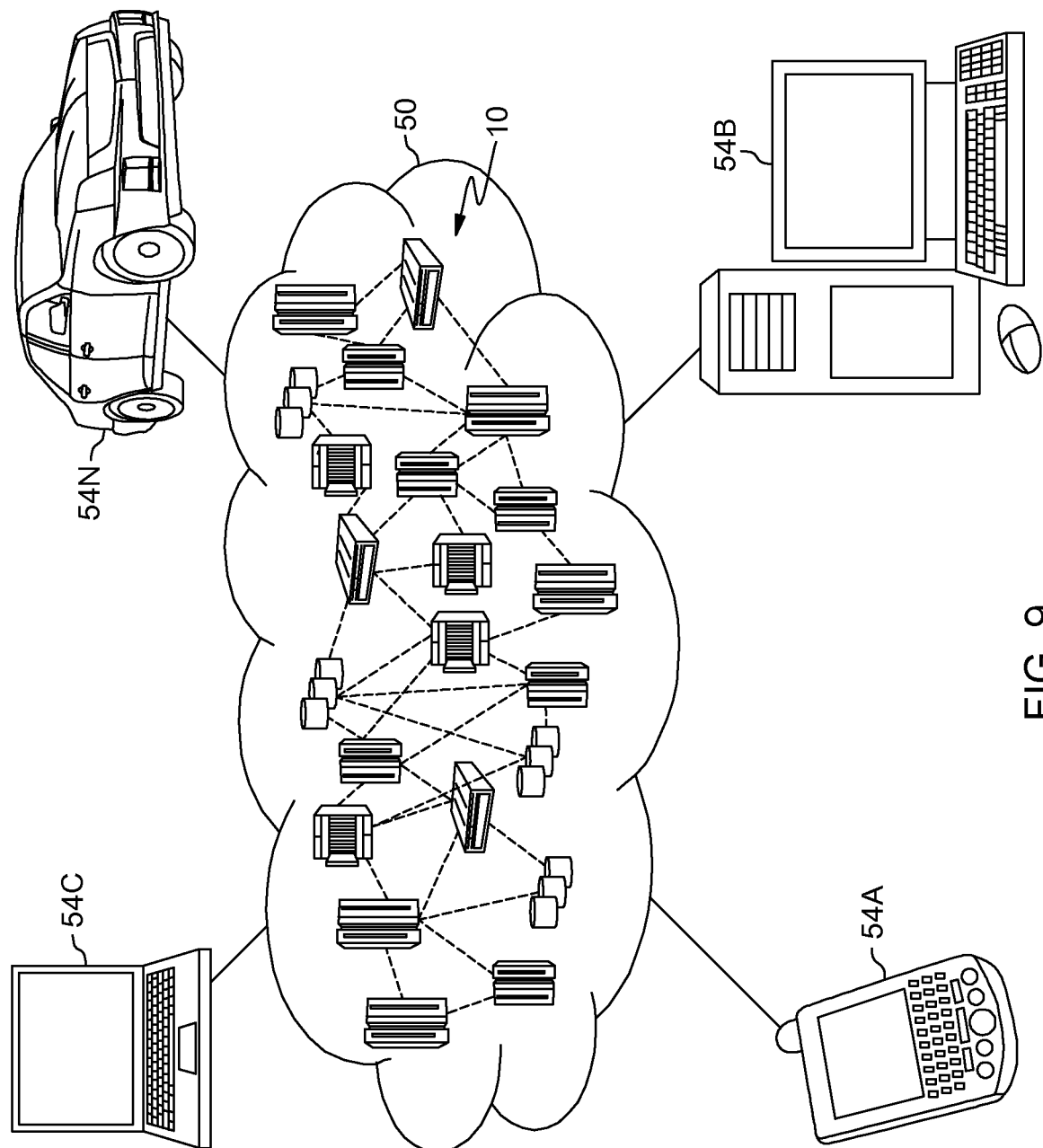
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
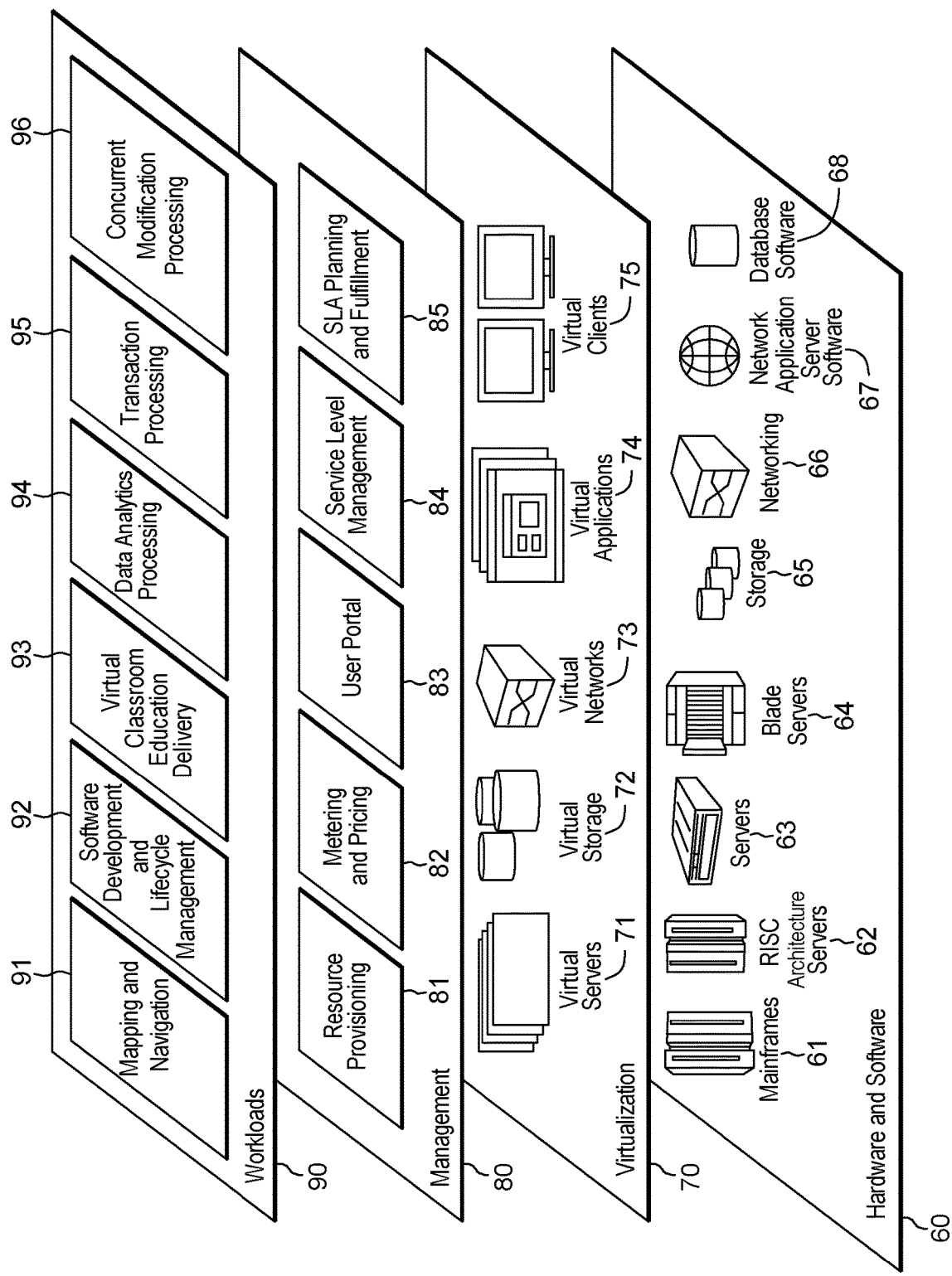
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and concurrent modification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one computer readable storage medium readable by at least one processing circuit and storing instructions for performing a method comprising:
        obtaining, from a plurality of processors of the computing environment, a plurality of store requests to store to a shared cache line, the plurality of store requests being of a concurrent store type in which non-exclusive access to the shared cache line for storing data by the plurality of processors is being requested; and
        storing concurrently, based on the plurality of store requests, data to the shared cache line, wherein the plurality of processors concurrently maintain write access to the shared cache line, and wherein the storing concurrently comprises storing the data directly to the shared cache line absent storing the data in one or more private caches of the plurality of processors and absent inspection by the plurality of processors of content within the shared cache line being updated by the data.

2. The computer program product of claim 1, wherein the method further comprises setting a cache directory state associated with the shared cache line to shared-modifiable indicating multiple store requests by multiple processors are permissible.

3. The computer program product of claim 1, wherein the data comprises an update to a global shared-modifiable structure maintained in the shared cache line.

4. The computer program product of claim 1, wherein the storing concurrently the data is performed absent sending a cross-invalidate to the plurality of processors.

5. The computer program product of claim 1, wherein the method further comprises:
 obtaining a fetch request requesting access to the shared cache line, the fetch request being different from the concurrent store type;
 performing serialization for the shared cache line based on the fetch request; and
 reading the data from the shared cache line, based on completing the serialization.

6. The computer program product of claim 5, wherein the performing serialization comprises:
 stopping outstanding stores to the shared cache line; and
 synchronizing data of the shared cache line.

7. The computer program product of claim 5, wherein the method further comprises changing ownership state of the shared cache line, based on the fetch request, from shared-modifiable to another state.

8. The computer program product of claim 7, wherein the other state is exclusive or read-only, based on the fetch request.

9. The computer program product of claim 1, wherein the obtaining the plurality of store requests comprises receiving a plurality of fetch due to non-coherent store requests from the plurality of processors, the plurality of fetch due to non-coherent store requests being architecturally defined to allow non-blocking modifications to the shared cache line.

10. The computer program product of claim 1, wherein the storing concurrently the data to the shared cache line comprises updating a shared counter of the shared cache line without knowing a value of the shared counter at a time of the storing.

11. A computer system for facilitating processing within a computing environment, the computer system comprising:
 a memory; and
 at least one processor in communication with the memory, wherein the computer system is configured to perform a method, said method comprising:
 obtaining, from a plurality of processors of the computing environment, a plurality of store requests to store to a shared cache line, the plurality of store requests being of a concurrent store type in which non-exclusive access to the shared cache line for storing data by the plurality of processors is being requested; and
 storing concurrently, based on the plurality of store requests, data to the shared cache line, wherein the plurality of processors concurrently maintain write access to the shared cache line, and wherein the storing concurrently comprises storing the data directly to the shared cache line absent storing the data in one or more private caches of the plurality of processors and absent inspection by the plurality of processors of content within the shared cache line being updated by the data.

12. The computer system of claim 11, wherein the method further comprises setting a cache directory state associated with the shared cache line to shared-modifiable indicating multiple store requests by multiple processors are permissible.

13. The computer system of claim 11, wherein the method further comprises:
 obtaining a fetch request requesting access to the shared cache line, the fetch request being different from the concurrent store type;
 performing serialization for the shared cache line based on the fetch request; and
 reading the data from the shared cache line, based on completing the serialization.

14. The computer system of claim 11, wherein the obtaining the plurality of store requests comprises receiving a plurality of fetch due to non-coherent store requests from the plurality of processors, the plurality of fetch due to non-coherent store requests being architecturally defined to allow non-blocking modifications to the shared cache line.

15. The computer system of claim 11, wherein the storing concurrently the data to the shared cache line comprises updating a shared counter of the shared cache line without knowing a value of the shared counter at a time of the storing.

16. A computer-implemented method of facilitating processing within a computing environment, the computer-implemented method comprising:
 obtaining, from a plurality of processors of the computing environment, a plurality of store requests to store to a shared cache line, the plurality of store requests being of a concurrent store type in which non-exclusive access to the shared cache line for storing data by the plurality of processors is being requested; and
 storing concurrently, based on the plurality of store requests, data to the shared cache line, wherein the plurality of processors concurrently maintain write access to the shared cache line, and wherein the storing concurrently comprises storing the data directly to the shared cache line absent storing the data in one or more private caches of the plurality of processors and absent inspection by the plurality of processors of content within the shared cache line being updated by the data.

17. The computer-implemented method of claim 16, further comprising setting a cache directory state associated with the shared cache line to shared-modifiable indicating multiple store requests by multiple processors are permissible.

18. The computer-implemented method of claim 16, further comprising:
 obtaining a fetch request requesting access to the shared cache line, the fetch request being different from the concurrent store type;
 performing serialization for the shared cache line based on the fetch request; and
 reading the data from the shared cache line, based on completing the serialization.

19. The computer-implemented method of claim 16, wherein the obtaining the plurality of store requests comprises receiving a plurality of fetch due to non-coherent store requests from the plurality of processors, the plurality of fetch due to non-coherent store requests being architecturally defined to allow non-blocking modifications to the shared cache line.

20. The computer-implemented method of claim 16, wherein the storing concurrently the data to the shared cache line comprises updating a shared counter of the shared cache line without knowing a value of the shared counter at a time of the storing.

* * * * *